US007227080B2

(12) United States Patent  
Kregle et al.

(10) Patent No.: US 7,227,080 B2
(45) Date of Patent: Jun. 5, 2007

(54) SELF-TRIMMING INTERIOR IN-WALL RECEPTACLE AND METHOD THEREFOR

(76) Inventors: Kim Kregle, 7602 N. Central Ave., Phoenix, AZ (US) 85012; Kevin E. Kregle, 18016 E. Santan Blvd., Queen Creek, AZ (US) 85242

( * ) Notice: Subject to any disclaimer, the term of this patent is extended or adjusted under 35 U.S.C. 154(b) by 55 days.

(21) Appl. No.: 11/277,108

(22) Filed: Mar. 21, 2006

(65) Prior Publication Data
US 2006/0151192 A1    Jul. 13, 2006

Related U.S. Application Data

(63) Continuation-in-part of application No. 10/843,768, filed on May 12, 2004, now abandoned.

(51) Int. Cl.
*H02G 3/08* (2006.01)
(52) U.S. Cl. .............. 174/50; 174/53; 174/57; 174/481; 220/3.2; 248/906
(58) Field of Classification Search ............. 174/50, 174/53, 57, 58, 480, 481; 220/3.2, 3.3, 3.4, 220/3.5, 3.6, 3.7, 3.8, 4.02; 248/906, 343; D13/152; 439/373, 535, 536, 537, 538; 29/592.1, 29/830, 832, 603.04
See application file for complete search history.

(56) References Cited

U.S. PATENT DOCUMENTS

| 3,659,037 | A | * | 4/1972 | MacDonald | 174/58 |
| 3,891,113 | A | * | 6/1975 | Salg | 220/3.6 |
| 4,063,660 | A | * | 12/1977 | Ware | 174/58 |
| 4,304,957 | A | * | 12/1981 | Slater et al. | 174/58 |
| 5,257,946 | A | * | 11/1993 | MacMillan et al. | 174/53 |
| 5,434,359 | A | * | 7/1995 | Schnell | 174/58 |
| 5,550,322 | A | * | 8/1996 | Tynan | 174/58 |
| 5,773,757 | A | * | 6/1998 | Kenney et al. | 174/53 |
| 6,444,906 | B1 | * | 9/2002 | Lewis | 174/53 |
| 6,586,679 | B2 | * | 7/2003 | Bashford | 174/58 |

* cited by examiner

*Primary Examiner*—Angel R. Estrada
(74) *Attorney, Agent, or Firm*—Craig Weiss; Jeffrey Weiss; Weiss & Moy, P.C.

(57) ABSTRACT

A self-trimming in-wall receptacle and method therefor, comprising a receptacle having a storage area, a trim and a coupling mechanism that allows a person to insert the receptacle into an opening in a wall. The receptacle is self-trimming and easy to couple to a wall, eliminating the need for complicated installation. The self-trimming in-wall receptacle can substantially flush-mount wall-mounted electrical objects such as smoke detectors, air conditioning control units, alarm keypads, doorbell chime boxes and the like, as well as store other objects.

5 Claims, 2 Drawing Sheets

SELF-TRIMMING INTERIOR IN-WALL RECEPTACLE AND METHOD THEREFOR

RELATED APPLICATION

This application is a continuation in part of U.S. patent application Ser. No. 10/843,768, filed on May 12, 2004 now abandoned.

FIELD OF THE INVENTION

This invention relates generally to in-wall receptacles and methods therefor and, more specifically, to a self-trimming in-wall receptacle that may be flush-mounted in an opening in drywall.

BACKGROUND OF THE INVENTION

Virtually all residential and commercial construction includes smoke detectors and air conditioning control units. These devices are almost always mounted externally on an interior wall, protruding several inches from the surface of the wall. In addition, residential construction typically includes doorbell chime boxes, which also protrude from the wall. External, wall-mounted devices are not only unaesthetic, they can cause injury to a passerby. They are also against the trend of modern construction, which is toward smooth interior wall surfaces with as few protrusions as possible.

It is commonplace to flush-mount electrical outlets inside both commercial and residential buildings. Typically, the outlet is coupled to a stud, and it is exposed through an opening in the drywall. A plate is then secured over the electrical box to hide its contents; i.e., these receptacles are not flush-mounted with trim. Light switches are similarly mounted.

A need exists for a self-trimming in-wall receptacle having a storage area and being capable of being inserted into an opening in a wall and coupled to the wall, while at the same time the receptacle has a trim that is dimensioned to cover the edge of the opening.

The present invention satisfies these needs and provides other, related advantages.

SUMMARY OF THE INVENTION

An object of the present invention is to provide a device capable of substantially flush-mounting wall-mounted objects that are usually externally mounted in a self-trimming receptacle.

A further object of the present invention is to provide a device capable of storing objects in an interior space behind a wall.

It is a further object of the present invention to provide a method for installing a self-trimming in-wall receptacle.

BRIEF DESCRIPTION OF THE PREFERRED EMBODIMENTS

In accordance with one embodiment of the present invention, a self-trimming in-wall receptacle is disclosed, comprising, in combination: a receptacle having an open end and a closed end and defining a storage area therebetween; a trim coupled to and extending from an outer edge of the open end of the receptacle; and at least one coupling mechanism coupled to the receptacle and dimensioned to couple the receptacle to a wall so that an inner surface of the trim is proximate an outer surface of the wall, an inner surface of the coupling mechanism is proximate an inner surface of the wall, and the closed end of the receptacle is housed inside an interior space behind the wall, wherein the trim, the receptacle, and the coupling mechanism form a one-piece assembly.

In accordance with another embodiment of the present invention, a method for installing a self-trimming in-wall receptacle is disclosed, comprising, in combination, the steps of: providing a receptacle having an open end and a closed end and defining a storage area therebetween; wherein the receptacle further comprises a trim coupled to and extending from an outer edge of the open end of the receptacle and at least one coupling mechanism coupled to the receptacle and dimensioned to couple the receptacle to a wall; wherein the trim and the receptacle and the at least one coupling mechanism form a one-piece assembly; cutting an aperture in a wall, wherein the aperture has an internal periphery greater than an outer periphery of the closed end of the receptacle and smaller than the outer periphery of the trim; positioning the receptacle within the aperture in an orientation that is slightly counterclockwise so that the receptacle is substantially non-parallel to a ground below the receptacle and the wall; and turning the receptacle to a position that is substantially parallel to the ground below, so that an inner surface of the at least one coupling mechanism is proximate an inner surface of the wall, an inner surface of the trim is proximate an outer surface of the wall, and the closed end of the receptacle is housed inside an interior space behind the wall, thereby coupling the receptacle to the wall.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
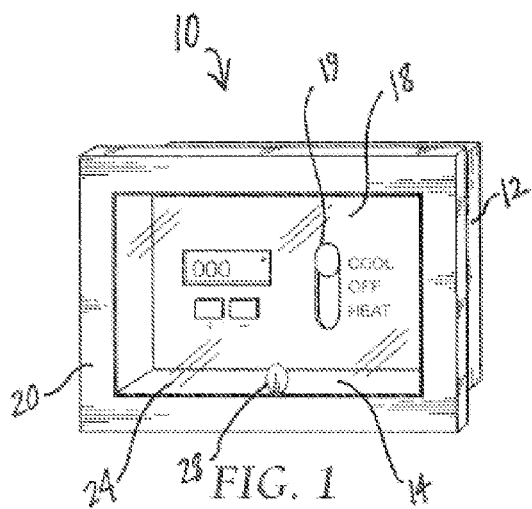
FIG. 1 is a front, perspective view of one embodiment of the self-trimming in-wall receptacle of the present invention.

Referring to FIGS. 1–3 and 5–8, reference number 10 refers generally to one embodiment of the self-trimming in-wall receptacle of the present invention. The self-trimming in-wall receptacle 10 comprises a receptacle 12 having an open end 14 (shown in FIG. 1) enclosed by a transparent covering 24 (shown in FIG. 1) and a closed end 16 (shown in FIGS. 2 and 5–7) and defining a storage area 18 (shown in FIG. 1) therebetween. The self-trimming in-wall receptacle 10 further comprises a trim 20 coupled to and extending from an outer edge of the open end 14 of the receptacle 12. The receptacle 12 and the trim 20 form a one-piece assembly and may be injection molded. Preferably, the receptacle 12 and the trim 20 are composed of high-impact injection molded thermal plastic, although substantial benefit could be derived from other injection molded materials, such as polyvinyl chloride and the like.

Figure 2:
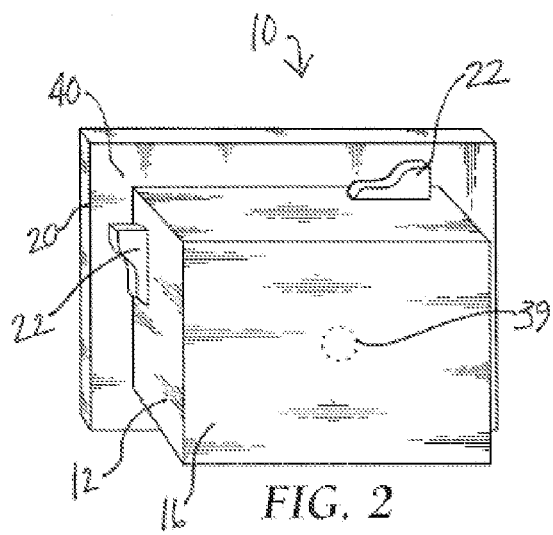
FIG. 2 is a back, perspective view of the self-trimming in-wall receptacle of FIG. 1.
Figure 3:
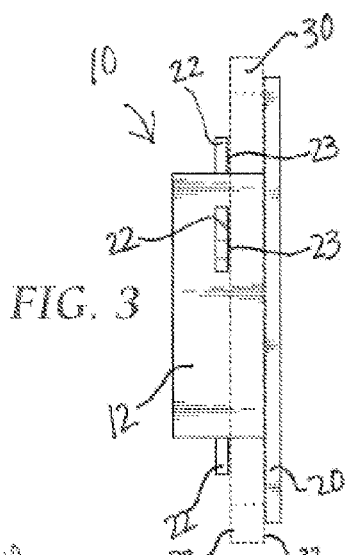
FIG. 3 is a side view of the self-trimming in-wall receptacle of FIG. 1, showing the receptacle coupled to a wall (shown in phantom) with the closed end of the receptacle being housed inside an interior space behind a wall.

The self-trimming in-wall receptacle 10 further comprises at least one coupling mechanism, to permit attachment of the receptacle 10 to drywall without the need to secure the receptacle 12 to a stud. Preferably, there is friction to substantially retain the orientation of the receptacle 10 on the drywall. In one embodiment (shown in FIGS. 2, 3, and 5–8), the coupling mechanism comprises four tabs 22. As shown in FIGS. 2–3, the tabs 22 may be disposed along the sides of the receptacle 12, and spaced rearward of the interior surface 40 of the trim 20 by approximately the thickness of a wall 30. In one embodiment, the tabs 22 are part of an overall one-piece assembly including the receptacle 12 and the trim 20. While in this embodiment four tabs 22 are used, more or less tabs 22 may be used, as desired.

It should be noted that one tab 22 may be sufficient to securely couple the receptacle 12 to the wall 30. Preferably, the tabs 22 are positioned in such a way that one tab 22 protrudes from each of the four sides of the receptacle 12. However, it would be possible to place the tabs 22 in a different arrangement, so long as the tabs 22 accomplish the same function of coupling the receptacle 12 to the wall 30.

Referring now to FIGS. 9–12, reference number 100 refers generally to another embodiment of the self-trimming in-wall receptacle of the present invention. The self-trimming in-wall receptacle 100 is substantially the same as the self-trimming in-wall receptacle 10, except that in the self-trimming in-wall receptacle 100, a frame 22a is used instead of the tabs 22 to secure the self-trimming in-wall receptacle 100 to the wall 30 (shown in FIGS. 11 and 12). For this reason, the same reference numbers used in describing the features of the self-trimming in-wall receptacle 10 will be used when describing the identical features of the self-trimming in-wall receptacle 100.

In this embodiment (shown in FIGS. 9–12), the coupling mechanism comprises a frame 22a. Preferably, the frame 22a is disposed along the sides of the receptacle 12, and spaced rearward of the interior surface 40 (shown in FIGS. 10–12) of the trim 20 (shown in FIGS. 9 and 10) by approximately the thickness of the wall 30. The frame 22a may consist of a separate piece that is coupled to the receptacle 12 in some manner, or the frame 22a may be part of an overall one-piece assembly of the self-trimming in-wall receptacle 100. Preferably, the frame 22a is substantially rectangular shaped. Further, preferably, the frame 22a is positioned in such a manner that is slightly diagonal to a floor below when the self-trimming in-wall receptacle 100 is secured in position on the wall 30.

The tabs 22 of the self-trimming in-wall receptacle 10 and the frame 22a of the self-trimming in-wall receptacle 100 are dimensioned to couple the receptacle 12 to a wall 30 (shown in FIGS. 3, 5–8, and 11–12), so that an inner surface 40 (shown in FIGS. 2, 7, 8, and 10–12) of the trim 20 is proximate an outer surface 32 (shown in FIG. 3) of the wall 30 and an inner surface 23 of the tabs 22 (shown in FIG. 3) or an inner surface 23a of the frame 22a (shown in FIG. 9) is proximate an inner surface 33 (shown in FIG. 3) of the wall 30. When the receptacle 12 is coupled to the wall 30, the closed end 16 of the receptacle 12 is housed inside an interior space 34 (shown in FIGS. 5–8, 11, and 12) behind the wall 30.

In one embodiment of the self-trimming in-wall receptacle 10 and another embodiment of the self-trimming in-wall receptacle 100 of the present invention, a covering 24 (shown in FIGS. 1 and 9) is coupled to the receptacle 12 proximate the open end 14. The covering 24 is dimensioned to cover the open end 14 of the receptacle 12. It should be clearly understood that the covering 24 may be hingedly coupled to the receptacle 12, or coupled in some other way (such as slidably or removably), so long as the covering 24 is capable of covering the open end 14 of the receptacle 12. In one embodiment of the self-trimming in-wall receptacle 10 (shown in FIG. 1) and another embodiment of the self-trimming in-wall receptacle 100 (shown in FIG. 9), the covering 24 is dimensioned to be substantially flush with the open end 14 of the receptacle 12. The covering 24 may define slits (not shown) or other apertures, in order to vent the storage area 18 of the receptacle 12. End portions of the covering 24 may define slits or a front surface of the covering 24 may define slits. Slits in end portions of the covering 24 may be more beneficial for venting heat, whereas slits in the front surface of the covering 24 may provide for better passage of sound waves for devices such as a doorbell chime sound generating device (not shown). In addition, it should be clearly understood that the covering 24 may be comprised of opaque plastic, translucent plastic, cloth, metal, glass, or any other kind of material so long as that material is capable of covering the open end 14 of the receptacle 12. While in the preferred embodiments the self-trimming in-wall receptacle 10 and self-trimming in-wall receptacle 100 comprise a covering 24, it should be clearly understood that substantial benefit could be derived from an alternative configuration of the self-trimming in-wall receptacle 10 or self-trimming in-wall receptacle 100 in which there is no covering 24.

Figure 9:
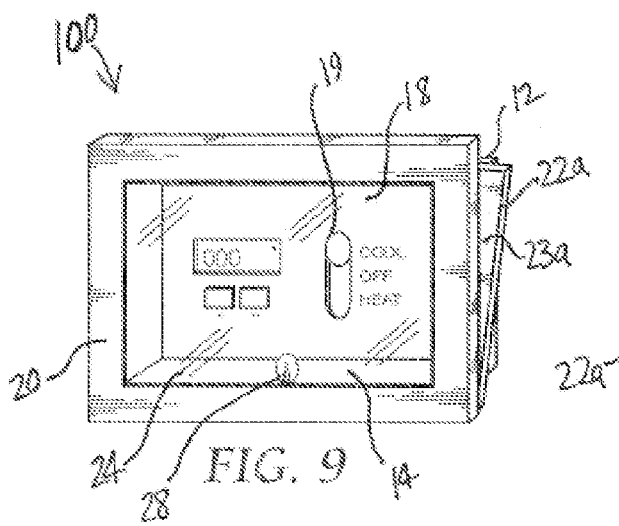
FIG. 9 is a front, perspective view of another embodiment of the self-trimming in-wall receptacle of the present invention, showing an air conditioning control unit disposed in the storage area.
Figure 10:
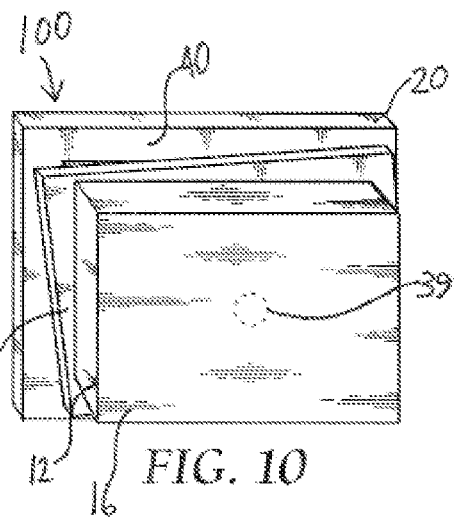
FIG. 10 is a back, perspective view of the self-trimming in-wall receptacle of FIG. 9.

Referring now to FIGS. 1 and 9, in one embodiment of the self-trimming in-wall receptacle 10 and another embodiment of the self-trimming in-wall receptacle 100 of the present invention, the covering 24 comprises at least one locking device 28 dimensioned to lock the covering 24 in a closed position over the open end 14 of the receptacle 12. The at least one locking device 28 is preferably coupled to the covering 24, although it should be clearly understood that substantial benefit could be derived from an alternative embodiment of the present invention in which the at least one locking device 28 is coupled to the receptacle 12 or the trim 20, so long as the at least one locking device 28 is capable of locking the covering 24 in a closed position with the covering 24 covering the open end 14 of the receptacle 12. It may be desired for the at least one locking device 28 to comprise a locking tab (not shown) dimensioned to be inserted into at least one slot (not shown) defined by the receptacle 12 or the covering 24.

In preferred embodiments, the self-trimming in-wall receptacle 10 and self-trimming in-wall receptacle 100 further comprise a key (not shown) dimensioned to be inserted into the at least one locking device 28 and turned to initiate locking of the covering 24. It may be desired for locking of the covering 24 to be accomplished by insertion of the locking tab into the at least one slot. In addition, the key may be used to open the covering 24 by removing the locking tab from the at least one slot. While in preferred embodiments the self-trimming in-wall receptacle 10 and self-trimming in-wall receptacle 100 comprise a covering 24 having a locking device 28, it should be clearly understood that substantial benefit could be derived from an alternative embodiment of the present invention in which there is a different type of locking mechanism or in which there is no locking device 28.

Figure 7:
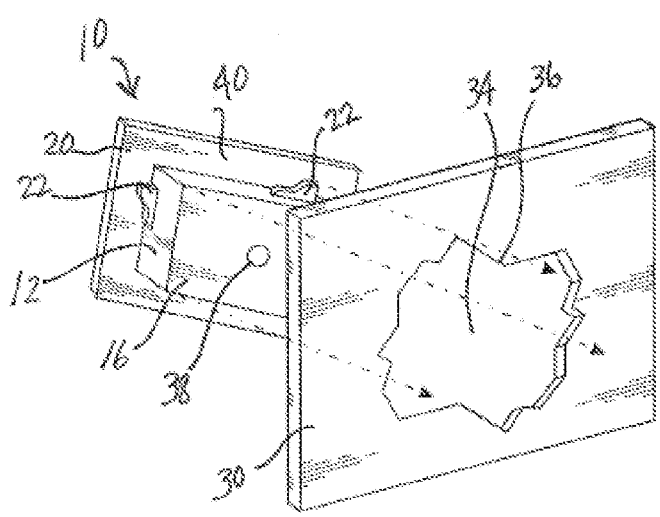
FIG. 7 is a back, perspective view of the self-trimming in-wall receptacle of FIG. 1, showing the receptacle being inserted into an aperture cut out of drywall.

In one embodiment of the self-trimming in-wall receptacle 10 of the present invention, shown in FIG. 7, the closed end 16 of the receptacle 12 defines at least one aperture 38 dimensioned to permit electrical wiring (not shown) to pass therethrough.

In additional embodiments of the self-trimming in-wall receptacle 10 and self-trimming in-wall receptacle 100 of the present invention, shown in FIGS. 2, 5, 6, and 10–12, the closed end 16 of the receptacle 12 defines a plurality of perforations 39 dimensioned to allow a person (not shown) to remove at least a portion of the closed end 16 of the receptacle 12 to permit electrical wiring to pass therethrough. In this way, a person may "punch-out" sections of the closed end 16 of the receptacle 12 in order to create apertures 38 or other spaces defined by the closed end 16 to allow for electrical wiring to pass therethrough.

While in the various embodiments of the self-trimming in-wall receptacle 10 and the self-trimming in-wall receptacle 100 the coupling mechanisms shown in the figures are described as a plurality of tabs 22 or a frame 22a, it should be clearly understood that substantial benefit could be derived from further securing the receptacle 12 to a wall 30 with an additional type of coupling mechanism. For example, it is within the spirit and scope of the invention that an outer surface of the closed end 16 of the receptacle 12 could be coupled with a coupling mechanism 22 directly to an interior surface of an opposite wall 30 on the other side of the interior space 34.

As described above, there are various ways to further couple the self-trimming in-wall receptacle 10 and self-trimming in-wall receptacle 100 to a wall 30. It may be desired to further secure the self-trimming in-wall receptacle 10 or self-trimming in-wall receptacle 100 in place by inserting screws (not shown) or the like through the trim 20 and into the wall 30. It may also be desired to further secure the self-trimming in-wall receptacle 10 or self-trimming in-wall receptacle 100 in place through the use of an adhesive, such as glue, an adhesive strip, or some other type of adhesive contacting interior surface 40.

In another embodiment (not shown) of the self-trimming in-wall receptacle 10 and self-trimming in-wall receptacle 100 of the present invention, the receptacle 12 has a width approximately equal to the distance between two wall studs. In this embodiment, the coupling mechanism 22 may further comprise at least one screw inserted through a side of the receptacle 12 and into a wall stud so as to couple the receptacle 12 to the wall 30. In typical 2×4 or 2×6 construction, a wall stud is placed approximately every 24 inches. With each stud approximately 0.75 inches wide, this leaves approximately 22.5 inches for the width of the receptacle 12 in order to be able to couple the receptacle 12 directly to wall studs on either side.

The storage area 18 of the self-trimming in-wall receptacle 10 and self-trimming in-wall receptacle 100 can house an air conditioning control unit 19 (shown in FIGS. 1 and 9), a doorbell chime sound generating device (not shown), alarm keypads (not shown), rifles (not shown), electronic timers (not shown), switches (not shown), valves (not shown), personal items, such as jewelry (not shown) or other items of value, or other desired objects. It may be desired to include within the storage area 18 or proximate thereto a light source, by which the storage area may be illuminated.

In the preferred embodiment of the present invention, shown in FIGS. 1–12, the distance between the closed end 16 and the open end 14 of the receptacle 12 is approximately 4 inches for 2×4 construction and approximately 6 inches for 2×6 construction, although it should be clearly understood that substantial benefit could be derived from an alternative configuration of the present invention in which the depth of the receptacle 12 is 8 inches, 12 inches, or more, if a void behind the wall 30 is sufficiently deep. The width of the receptacle 12 is preferably between approximately 4 inches and approximately 22.5 inches. Preferably, the trim 20 extends approximately 0.5 inches to approximately 1.5 inches from the outer edge of the open end 14 of the receptacle 12. The height of the receptacle 12 is limited only by the distance between the floor and the ceiling, making it possible, therefore, to provide a long, substantially rectangular receptacle 12 capable of storing relatively long objects, such as rifles.

While in the preferred embodiment of the present invention the depth of the receptacle 12 is between approximately 4 inches and 6 inches, the width of the receptacle 12 is between approximately 4 inches and 22.5 inches, and the length of the trim is between approximately 0.5 inches and approximately 1.5 inches, it should be clearly understood that substantial benefit could be derived from an alternative configuration of the self-trimming in-wall receptacle 10 or self-trimming in-wall receptacle 100 in which different sizes are used, even those that deviate, even substantially, from the preferred measurements, in either direction.

STATEMENT OF OPERATION

Figure 4:
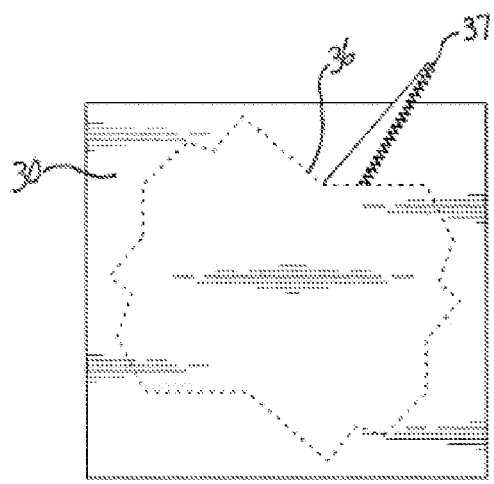
FIG. 4 is a back view of a section of drywall, showing a pattern for an aperture cut out of the drywall, consistent with an embodiment of the present invention.

Referring to FIGS. 4 and 7, in order to make use of the self-trimming in-wall receptacle 10, one must first cut an aperture 36 into the wall 30. The aperture 36 must have an internal periphery greater than the outer periphery of the closed end 16 of the receptacle 12. At the same time, the aperture 36 must have an internal periphery smaller than the outer periphery of the trim 20. Preferably, the wall 30 is drywall, and the implement used to create the aperture 36 is a handsaw 37 (shown in FIG. 4), knife (not shown) or other sharp implement. However, it should be clearly understood that substantial benefit could be derived from installing the self-trimming in-wall receptacle 10 into a wall made of another type of material, such as wood, foam, metal, plastic, etc., using either the same cutting implements mentioned above or alternative cutting mechanisms. Preferably, the wall is an interior wall of a structure. However, it should be understood that substantial benefit could be derived from installing the self-trimming in-wall receptacle 10 in an outer wall of a structure.

Figure 5:
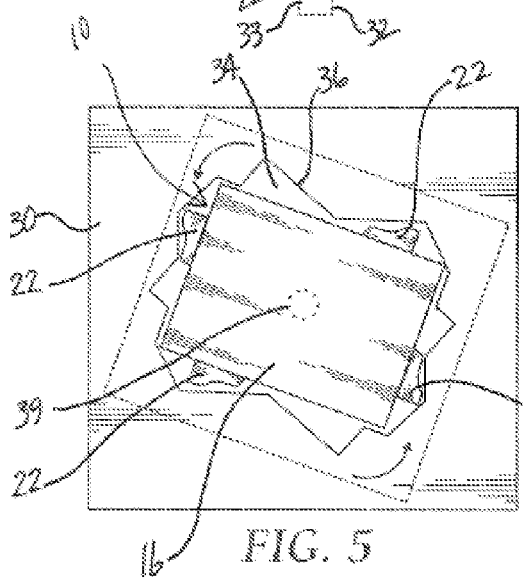
FIG. 5 is a back view of the self-trimming in-wall receptacle of FIG. 1, showing the receptacle being inserted into an aperture cut out of the drywall.
Figure 6:
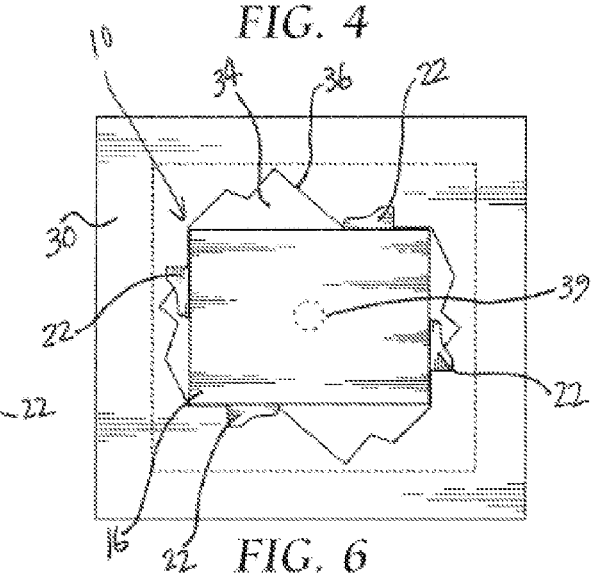
FIG. 6 is a back view of the self-trimming in-wall receptacle of FIG. 1, showing the receptacle coupled to drywall with the closed end of the receptacle being housed inside an interior space behind the drywall.
Figure 8:
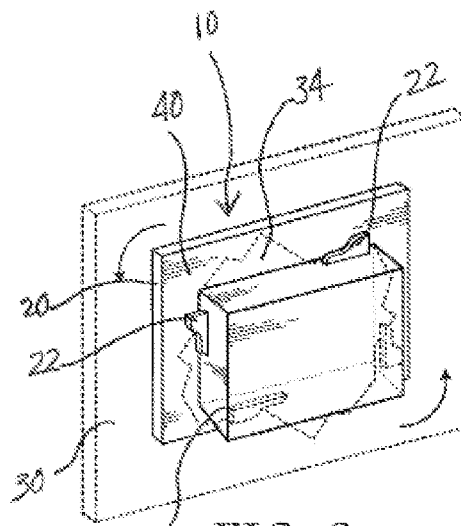
FIG. 8 is a back, perspective view of the self-trimming in-wall receptacle of FIG. 1, showing the receptacle coupled to drywall with the closed end of the receptacle being housed inside an interior space behind the drywall.
Figure 11:
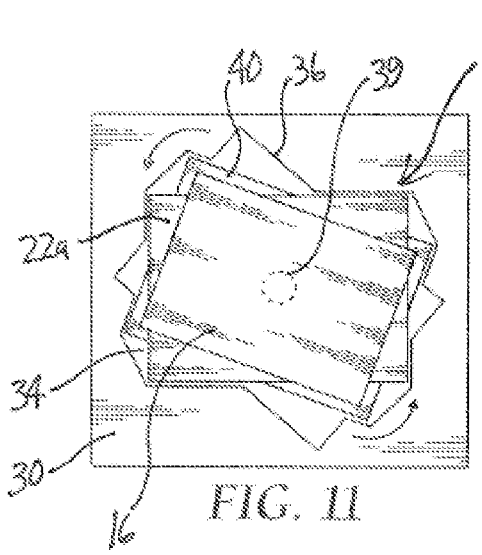
FIG. 11 is a back view of the self-trimming in-wall receptacle of FIG. 9, showing the receptacle being inserted into an aperture cut out of drywall.
Figure 12:
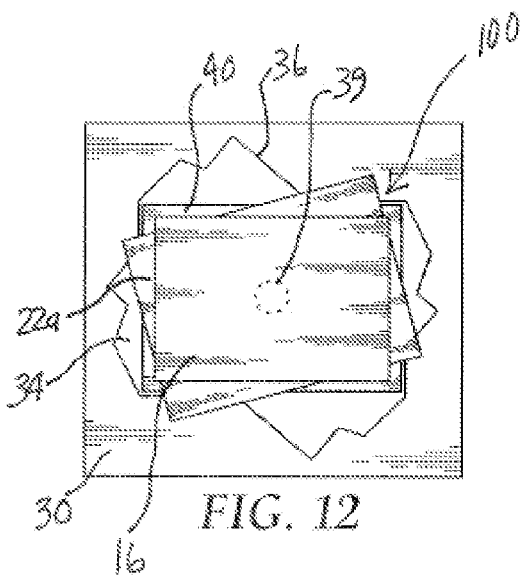
FIG. 12 is a back view of the self-trimming in-wall receptacle of FIG. 9, showing the receptacle coupled to drywall with the closed end of the receptacle being housed inside an interior space behind the drywall.

Referring now to FIGS. 3, 5, 6, 11, and 12, after the aperture 36 has been cut out of the wall 30, the closed end 16 of the receptacle 12 is inserted into the wall 30 through the aperture 36 so that the closed end 16 of the receptacle 12 is housed inside an interior space 34 behind the wall 30. At the same time, an inner surface of the trim 20 rests proximate an outer surface 32 of the wall 30 (as shown in FIG. 3) and an inner surface 23 of the tabs 22 (shown in FIG. 3) or an inner surface 23a of the frame 22a (shown in FIG. 9) rests proximate an inner surface 33 (shown in FIG. 3) of the wall 30. The receptacle 12 is coupled securely to the wall 30 through the use of either the tabs 22 or frame 22a. In the preferred embodiments, the self-trimming in-wall receptacle 10 or self-trimming in-wall receptacle 100 is first tilted slightly counter-clockwise (as shown in FIGS. 5, 7, and 11) and then placed through the aperture 36 until the trim 20 rests proximate an outer surface 32 of the wall 30 (as shown in FIGS. 5 and 11). The self-trimming in-wall receptacle 10 or self-trimming in-wall receptacle 100 is then tilted back to an upright position, so that the receptacle 12 is substantially parallel to a floor below (as shown in FIGS. 6, 8, and 12). The tabs 22 or frame 22a should be aligned behind the wall 30 in such a way that the self-trimming in-wall receptacle 10 or self-trimming in-wall receptacle 100 is firmly in place.

As shown by way of example in FIGS. 4, 7, and 11, in one embodiment, part of the lower portion of the aperture 36 is substantially parallel to the ground below the receptacle 12. In this fashion, when the receptacle 12 is moved to its upright position, a portion of the underside of the receptacle 12 will rest on the portion of the aperture 36 that is parallel to the ground.

While various methods for coupling the self-trimming in-wall receptacle 10 or self-trimming in-wall receptacle 100 to a wall 30 have been disclosed, it is within the spirit and scope of this invention that alternative coupling methods be used so long as the result is the secure coupling of the receptacle 12 to the wall 30 with the closed end 16 of the receptacle housed in an interior space 34 behind the wall 30 and an interior surface of the trim 20 proximate an outer surface 32 of the wall 30.

While the invention has been particularly shown and described with reference to preferred embodiments thereof, it will be understood by those skilled in the art that the foregoing and other changes in form and details may be made therein without departing from the spirit and scope of the invention.

We claim:

1. A method for installing a self-trimming in-wall receptacle comprising, in combination, the steps of:
   providing a receptacle having an open end and a closed end and defining a storage area therebetween;
   wherein the receptacle further comprises a trim coupled to and extending from an outer edge of the open end of the receptacle and at least one coupling mechanism coupled to the receptacle and dimensioned to couple the receptacle to a wall;
   wherein the trim and the receptacle and the at least one coupling mechanism form a one-piece assembly;
   cutting an aperture in a wall, wherein the aperture has an internal periphery greater than an outer periphery of the closed end of the receptacle and smaller than an outer periphery of the trim;
   positioning the receptacle within the aperture in an orientation that is slightly counterclockwise so that the receptacle is substantially non-parallel to a ground below the receptacle and the wall; and
   turning the receptacle to a position that is substantially parallel to the ground below, so that an inner surface of the at least one coupling mechanism is proximate an inner surface of the wall, an inner surface of the trim is proximate an outer surface of the wall, and the closed end of the receptacle is housed inside an interior space behind the wall, thereby coupling the receptacle to the wall.

2. The method of claim 1 further comprising the steps of:
   providing a covering dimensioned to cover the open end of the receptacle; and
   coupling the covering to the receptacle proximate the open end.

3. The method of claim 1 further comprising the steps of:
   providing a locking device coupled to a covering; and
   locking the covering so that the covering substantially covers the open end of the receptacle.

4. The method of claim 1 further comprising the step of removing at least one portion of the closed end of the receptacle so that the closed end of the receptacle defines at least one aperture dimensioned to permit electrical wiring to pass therethrough.

5. The method of claim 1 further comprising the step of providing a light source coupled to an interior surface of the receptacle and dimensioned to illuminate the storage area.

* * * * *